United States Patent
Tiwari

(10) Patent No.: US 8,913,553 B2
(45) Date of Patent: Dec. 16, 2014

(54) METHOD OF HANDLING CLOSE SUBSCRIBER GROUP LIST SYNCHRONIZATION

(75) Inventor: Kundan Tiwari, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 126 days.

(21) Appl. No.: 13/188,455

(22) Filed: Jul. 21, 2011

(65) Prior Publication Data

US 2012/0020295 A1 Jan. 26, 2012

Related U.S. Application Data

(60) Provisional application No. 61/366,943, filed on Jul. 23, 2010.

(51) Int. Cl.
| | | |
|---|---|---|
| H04W 8/02 | (2009.01) | |
| H04W 8/04 | (2009.01) | |
| H04W 8/18 | (2009.01) | |
| H04W 48/02 | (2009.01) | |
| H04W 8/20 | (2009.01) | |
| H04W 48/16 | (2009.01) | |
| H04W 48/18 | (2009.01) | |

(52) U.S. Cl.
CPC ............ *H04W 48/02* (2013.01); *H04W 8/205* (2013.01); *H04W 48/16* (2013.01); *H04W 48/18* (2013.01)
USPC ........... 370/328; 370/331; 370/310; 455/433; 455/437

(58) Field of Classification Search
USPC .......... 370/328, 310, 331, 352; 455/410, 411, 455/433, 434, 437, 501
See application file for complete search history.

(56) References Cited

U.S. PATENT DOCUMENTS

| 7,154,973 B2 * | 12/2006 | Hanada et al. ............ 375/354 |
| 2009/0070694 A1 * | 3/2009 | Ore et al. ................ 715/764 |
| 2009/0092097 A1 * | 4/2009 | Nylander et al. .......... 370/331 |
| 2009/0093232 A1 * | 4/2009 | Gupta et al. ............. 455/410 |
| 2009/0168727 A1 * | 7/2009 | Somasundaram et al. ... 370/332 |
| 2009/0270092 A1 * | 10/2009 | Buckley et al. ........... 455/434 |

(Continued)

FOREIGN PATENT DOCUMENTS

| CN | 1808994 A | 7/2006 |
| CN | 101651586 A | 2/2010 |
| EP | 2117261 A1 | 11/2009 |
| WO | 2010059122 A2 | 5/2010 |

OTHER PUBLICATIONS

European patent application No. 11006034.0, European Search Report mailing date: Oct. 7, 2011.

(Continued)

*Primary Examiner* — Andrew Chriss
*Assistant Examiner* — John Lequang
(74) *Attorney, Agent, or Firm* — Winston Hsu; Scott Margo

(57) ABSTRACT

A method of handling CSG list synchronization for a network in a wireless communication system is disclosed. The method comprises associating a version number with a user subscribed CSG identities (IDs) list, wherein the user subscribed CSG IDs list is stored in the network; and sending the version number in a OTA (over-the-air) message or in a NAS (non-access stratum) message when the version number is currently used by the network, wherein the OTA message is intended to update an operator CSG list which is stored in a mobile device.

13 Claims, 5 Drawing Sheets

(56) References Cited

U.S. PATENT DOCUMENTS

| | | | |
|---|---|---|---|
| 2009/0305699 A1* | 12/2009 | Deshpande et al. | 455/434 |
| 2010/0029283 A1* | 2/2010 | Iwamura | 455/437 |
| 2010/0110945 A1* | 5/2010 | Koskela et al. | 370/310 |
| 2010/0161794 A1* | 6/2010 | Horn et al. | 709/224 |
| 2011/0223887 A1* | 9/2011 | Rune et al. | 455/411 |
| 2011/0237250 A1* | 9/2011 | Horn et al. | 455/433 |

OTHER PUBLICATIONS

Motorola, "More Discussion on the Operator CSG list", 3GPP TSG-SA WG1 Meeting #49, S1-100116, Feb. 22-26, 2010, San Francisco, USA, XP050431614, p. 1-2.

3GPP TS 24.285 V10.0.0 (Jun. 2010), "3rd Generation Partnership Project; Technical Specification Group Core Network and Terminals; Allowed Closed Subscriber Group (CSG) list; Management Object (MO) (Release 10)", XP050441748, p. 1-14.

European patent application No. 11006034.0, European application filing date: Jul. 22, 2011, European Search Report mailing date: Jan. 20, 2012.

Vodafone, Qualcomm Incorporated, Deutsche Telekom, Telecom Italia, "Removal of requirement to inhibit Allowed CSG List and VPLMN Autonomous CSG Roaming clarifications", 3GPP TSG-SA WG1 Meeting #51, S1-102388, Aug. 23-27, 2010, Seoul, South Korea, XP050448127, p. 1-5.

3GPP TS 22.220 V10.3.0 (Jun. 2010) Technical Specification 3rd Generation Partnership Project; Technical Specification Group Services and System Aspects; Service requirements for Home Node B (HNB) and Home eNode B (HeNB) (Release 10).

Office action mailed on Aug. 9, 2013 for the China application No. 201110209266.3, filed Jul. 25, 2011, p. 1-9.

* cited by examiner

METHOD OF HANDLING CLOSE SUBSCRIBER GROUP LIST SYNCHRONIZATION

CROSS REFERENCE TO RELATED APPLICATIONS

This application claims the benefit of U.S. Provisional Application No. 61/366,943 filed on Jul. 23, 2010 and entitled "Method to synchronize Operator CSG List between a UE and a network", the contents of which are incorporated herein.

BACKGROUND OF THE INVENTION

1. Field of the Invention

The application relates to a method and a related communication device used in a wireless communication system and related communication device, and more particularly, to a method of handling close subscriber group (CSG) list synchronization in a wireless communication system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the LTE system, a home base station, sometimes called a femto base station or a pico base station, is considered to be a promising solution for many issues in mobile communication networks, such as coverage, capacity, and cost. The home base station delivers a great user experience in homes, office buildings or schools, at very low cost, using customer's broadband access (e.g. digital subscriber line (DSL) or cable television backhaul). For this application, the home base station usually serves small cellular coverage that has a restricted group of users and only allows access and provides service to the restricted group of users, which can be referred as to a close subscriber group (CSG). Such cells providing the small cellular coverage are referred to as femto-cells, Home Node B (HNB) cells, Home e-Node B (HeNB) cells or, most commonly, CSG cells.

The CSG cell is accessible only for a limited set of UEs (i.e. closed subscriber group). In order to prevent a UE from attempting to register on a CSG cell on which they do not have access, the UE maintains an allowed CSG list, i.e. a list of CSG identities (ids) for which access has been granted to the UE. The CSG id is an identifier broadcast by the CSG cell or cells and used by the UE to facilitate access for authorized members of the associated closed subscriber group. It shall be possible to store the allowed CSG list in the USIM (Universal Subscriber Identity Module) of the UE. When available, the allowed CSG list on the USIM shall be used. It shall be possible for both, an operator and a user, to modify the allowed CSG list. Based on home operator preference, the use of the allowed CSG list may be inhibited. The operator preference dictates if the allowed CSG list in a ME (mobile equipment) shall be used or not. On the other hand, the UE shall maintain an operator controlled list of allowed CSG identities (e.g. operator CSG list). It shall be possible to store the operator CSG list in the USIM of the UE. When available, the operator CSG list on the USIM shall be used. It shall be possible for the operator to modify the operator CSG list.

All the CSG cells sharing the same identity are identifiable as a single group for the purposes of mobility management and charging in a PLMN (public land mobile network). A VPLMN (Visit PLMN) may provide CSG membership to the roaming subscriber without exchanging any CSG specific information with a HPLMN (Home PLMN). The HPLMN shall be able to instruct the UE so that it will not attempt to access CSG cells not contained in the allowed or operator CSG lists while in a VPLMN. The HPLMN shall be able to configure this restriction on a per VPLMN basis.

According to subclause 5.3.2 of section 1 in 3GPP specification TS 22.220 Va.3.0, the operator may inhibit the use of Allowed CSG List based on the operator preference. In this case Manual CSG selection to a CSG ID which is not in the operator CSG list is not possible as a UE can't add this in the Operator CSG List. Hence, when a user subscribed CSG IDs list is not in sync between a UE and a network, then the user will loose the service of subscribed CSG cells which CSG IDs are not in the UE's Operators CSG List due to loss of an OTA (over-the-air) message intended to update the UE's Operator CSG list. The user can't add this CSG ID of these CSG cells to the Operator CSG List through manual CSG ID selection procedure and there is no way to let the network know that the list of CSG IDs in UE's Operator CSG List. This will cause loss of subscribed CSG Cell services to the user for unspecified period of time.

For a manual CSG selection, the user shall be able to request the UE to perform a scan for available CSGs. When such request is received the UE shall perform a scan of available CSGs, their CSG Identities and their HNB Names. In the UE display, the available CSGs shall be represented by their associated HNB Names and PLMN Name(s). According to subclause 5.3.1 of section 1 in 3GPP specification TS 22.220 Va.3.0, a HPLMN can instruct a UE not to access CSG cells not contained in the allowed or operator CSG lists while in a VPLMN. The HPLMN shall be able to configure this restriction on a per VPLMN basis. According 3GPP specification, however, the UE will display all available CSG IDs at that location during manual CSG selection procedure. The user can select the CSG ID which is not in its Allowed CSG List or Operator CSG List. The UE will then try to access this CSG cell by initiating Registration Procedure which is not desired by the HPLMN in some VPLMN as per requirement described above. So, displaying CSG IDs not belonging to Allowed CSG List or Operator CSG List to user in manual selection will defeat the requirement.

SUMMARY OF THE INVENTION

A method of handling close subscriber group (CSG) list synchronization in a wireless communication system is provided.

A method of handling CSG list synchronization for a network in a wireless communication system is disclosed. The method comprises associating a version number with a user subscribed CSG identities (IDs) list, wherein the user subscribed CSG IDs list is stored in the network; and sending the version number in a OTA (over-the-air) message or in a NAS (non-access stratum) message when the version number is currently used by the network, wherein the OTA message is intended to update an operator CSG list which is stored in a mobile device.

A method of handling CSG list synchronization for a mobile device in a wireless communication system is disclosed. The method comprises receiving a version number in an OTA message or a NAS message from a network; and associating the version number with an operator CSG list stored in the mobile device.

A method of handling CSG list synchronization for a mobile device in a wireless communication system is disclosed. The method comprises only displaying a plurality of CSG IDs of a plurality CSG cells contained in an operator CSG list or an allowed CSG list during a manual CSG ID selection.

A method of handling CSG list synchronization for a mobile device in a wireless communication system is disclosed. The method comprises displaying a plurality of all available CSG IDs of a plurality CSG cells contained during a manual CSG ID selection; and not initiating a registration procedure and displaying error when a user selects a CSG ID of a CSG cell, wherein the CSG ID of the CSG cell is not contained in an operator CSG list or an allowed CSG list.

A communication device for handling CSG list synchronization in a wireless communication system is disclosed. The communication device comprises means for associating a version number with a user subscribed CSG IDs list, wherein the user subscribed CSG IDs list is stored in the network; and sending the version number in a OTA message or in a NAS message when the version number is currently used by the network, wherein the OTA message is intended to update an operator CSG list which is stored in a mobile device.

A communication device for handling CSG list synchronization in a wireless communication system is disclosed. The communication device comprises means for receiving a version number in an OTA message or a NAS message from a network; and associating the version number with an operator CSG list stored in the mobile device.

A communication device for handling CSG list synchronization in a wireless communication system is disclosed. The communication device comprises means for only displaying a plurality of CSG IDs of a plurality CSG cells contained in an operator CSG list or an allowed CSG list during a manual CSG ID selection.

A communication device for handling CSG list synchronization in a wireless communication system is disclosed. The communication device comprises means for displaying a plurality of all available CSG IDs of a plurality CSG cells contained during a manual CSG ID selection; and means for not initiating a registration procedure and displaying error when a user selects a CSG ID of a CSG cell, wherein the CSG ID of the CSG cell is not contained in an operator CSG list or an allowed CSG list.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
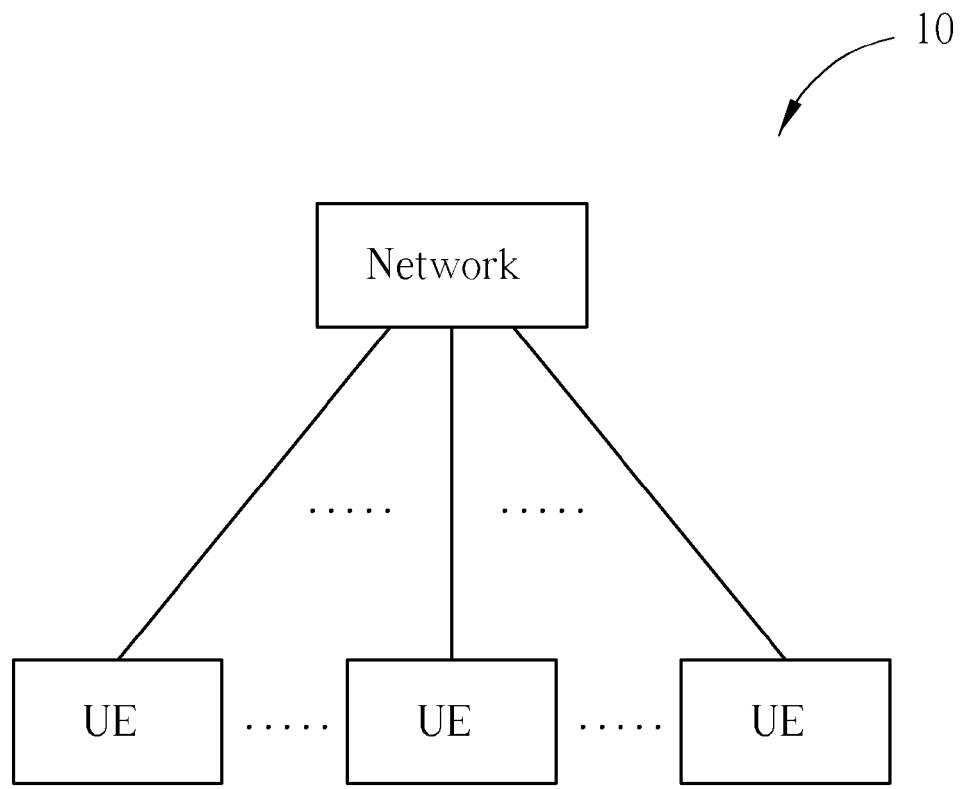
FIG. 1 is a schematic diagram of an exemplary wireless communication system.

Please refer to FIG. 1, which is a schematic diagram of an exemplary wireless communication system 10. The wireless communication system 10, such as a long-term evolution (LTE) system, Universal Mobile Telecommunications System (UMTS) or other mobile communication systems, is briefly composed of a network and a plurality of user equipments (UEs). In FIG. 1, the network and the UEs are simply utilized for illustrating the structure of the wireless communication system 10. Practically, the network of the LTE system comprises a plurality of base stations such as an E-UTRAN (evolved-UTAN), which comprises a plurality of evolved Node-Bs (eNBs). The network of the UMTS system comprises a plurality of base stations such as an UTRAN, which comprises a plurality of Node-Bs (NBs). The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 2:
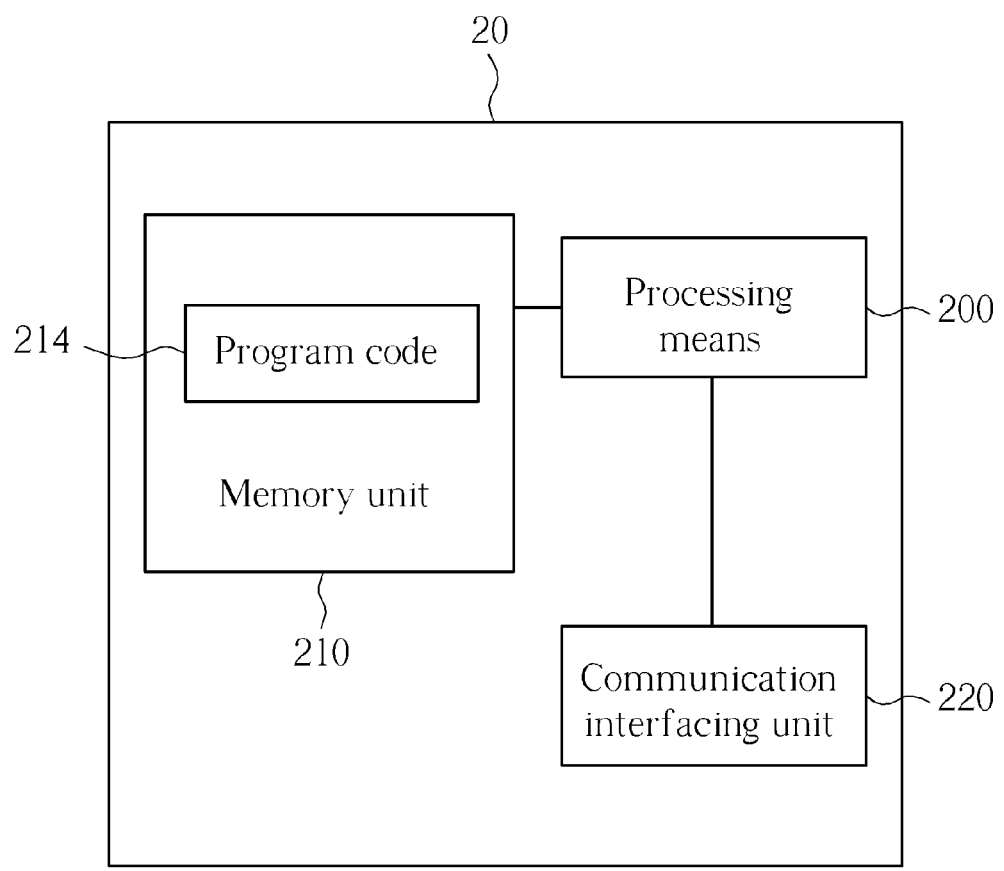
FIG. 2 is a schematic diagram of an exemplary communication device.

FIG. 2 is a schematic diagram of an exemplary communication device 20. The communication device 20 can be the UE shown in FIG. 1 and may include a processor 200 such as a microprocessor or ASIC, a memory unit 210, and a communication interfacing unit 220. The memory unit 210 may be any data storage device that can store program code 214, for access by the processor 200. Examples of the memory unit 210 include but are not limited to a subscriber identity module (SIM), read-only memory (ROM), random-access memory (RAM), CD-ROMs, hard disks, and optical data storage devices. The communication interfacing unit 220 is preferably a radio transceiver for wirelessly communicating with the network according to processing results of the processor 200.

Figure 3:
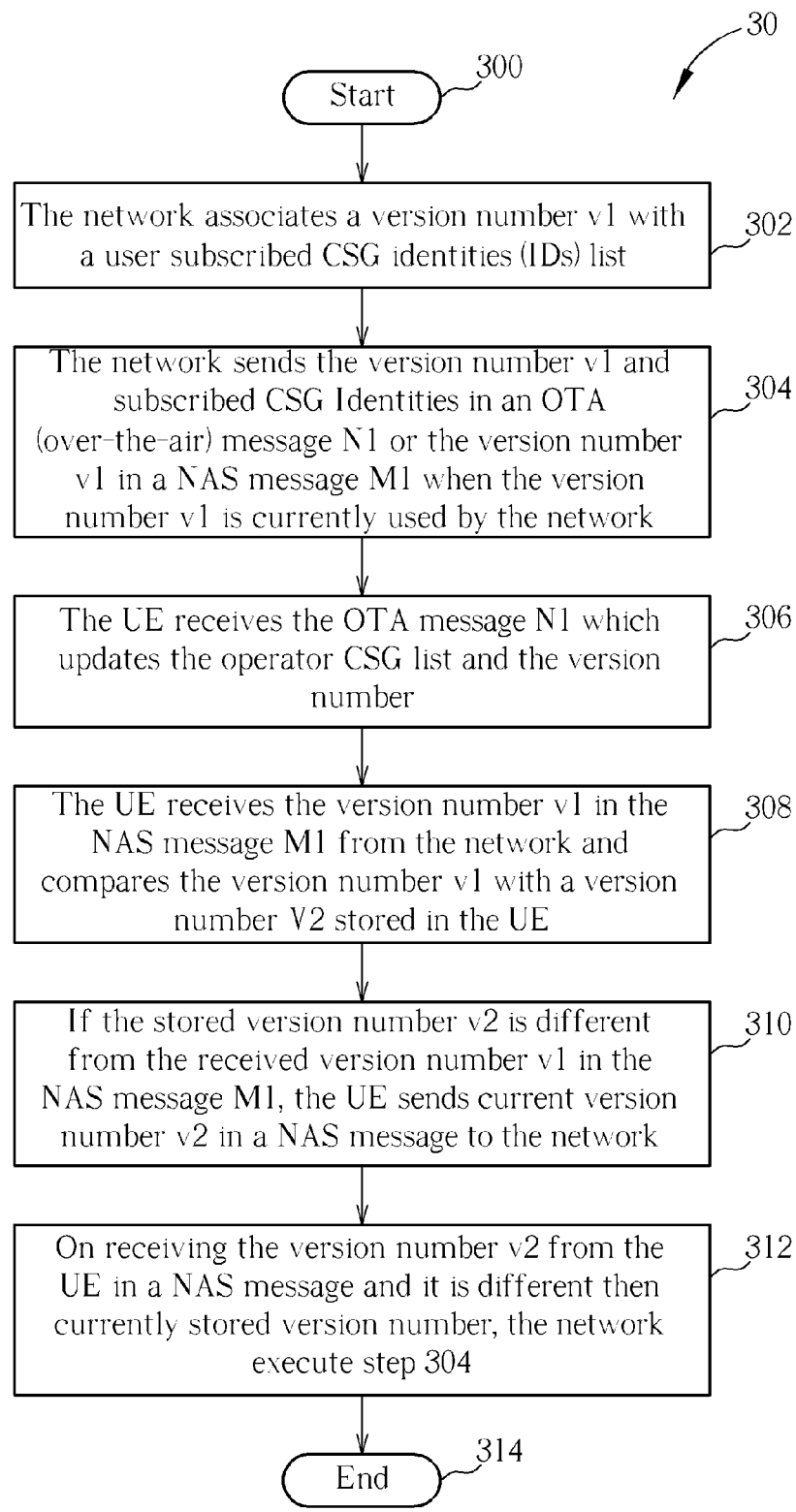
FIG. 3 is a flowchart of an exemplary process.

Please refer to FIG. 3, which is a flowchart of an exemplary process 30. The process 30 is utilized for handling close subscriber group (CSG) list synchronization for a wireless communication system and can be compiled into the program code 214. The wireless communication system could be the wireless communication system 10 and includes a network and a UE. The process 30 includes the following steps:

Step 300: Start.
Step 302: The network associates a version number v1 with a user subscribed CSG identities (IDs) list.
Step 304: The network sends the version number v1 and subscribed CSG Identities in an OTA (over-the-air) message N1 or the version number v1 in a NAS message M1 when the version number v1 is currently used by the network.
Step 306: The UE receives the OTA message N1 which updates the operator CSG list and the version number.
Step 308: The UE receives the version number v1 in the NAS message M1 from the network and compares the version number v1 with a version number V2 stored in the UE.
Step 310: If the stored version number v2 is different from the received version number v1 in the NAS message M1, the UE sends current version number v2 in a NAS message to the network.
Step 312: On receiving the version number v2 from the UE in a NAS message and it is different then currently stored version number, the network execute step 304.
Step 314: End.

According to the process 30, the network associates the version number v1 with the user subscribed CSG IDs list. The user subscribed CSG IDs list is stored in the network. Further, the network sends the version number v1 and subscribed CSG Identities in the OTA message N1 or sends the version number v1 in the NAS message M1 when the version number v1 is currently used by the network. The OTA message is intended to update the operator CSG IDs list which is stored in the UE. Accordingly, the UE receives the OTA message N1 and associates the version number v1 with the operator CSG list. As a result, the UE and network can synchronize CSG lists stored in each end. Namely, the user subscribed CSG IDs list stored in the network is synchronized with the operator CSG list stored in the UE. In this way, the network could know the list of CSG IDs in UE's operator CSG list.

In addition, the network increases the version number v1 when any change related to the user subscribed CSG IDs list has been made due to new registration or expiration or modification.

A version field may be defined in an elementary file (i.e. $EF_{OCSGL}$) to associate the operator CSG list with its current version. This $EF_{OCSGL}$ elementary file contains the coding for CSG IDs belonging to the operator CSG lists. Furthermore, for each CSG ID in the list, a link to the corresponding H (e) NB name and CSG type may be provided. Within one PLMN (public land mobile network) the first occurrence of CSG ID indicates the highest priority CSG ID and the last occurrence indicates the lowest. The UE updates the version field of $EF_{OCSGL}$ corresponding to the version number received in the OTA message (e.g. version number v1).

After receiving the version number v1 in the NAS message M1 from the network the UE compares the version number v1 with a version number V2 stored in the UE. The UE sends the current version number v2 in a NAS message M2 to the network if the version number v1 does not match the current version number v2 of the operator CSG list stored in the UE. The current version number v2 is currently used by the UE and associated with the operator CSG list stored in the UE. The current version number v2 could be stored in the $EF_{OCSGL}$ elementary file. For example, the UE sends the current version number in a Location Update Request message during registration procedures (power on procedure) when the difference in the received version number (e.g. v1) and stored version number (e.g. v2) in the UE is more than one. The network may send a OTA message N2 to the UE to update the version number v2 of the operator CSG lists, thereby performing CSG list synchronization between the network an the UE.

In some examples, the network may send a NAS message M3 to query for the current version number v2. Upon the reception of the NAS message M3, the UE sends a current version number v2 in a NAS message M4 to the network in response. If the network finds out the version number v1 used by the network does not match the version number v2, the network updates UE's operator CSG list by the same way.

A VPLMN (Visit PLMN) may provide CSG membership to the roaming subscriber without exchanging any CSG specific information with a HPLMN (Home PLMN). The HPLMN shall be able to instruct the UE so that it will not attempt to access CSG cells not contained in the allowed or operator CSG lists while in a VPLMN. The HPLMN shall be able to configure this restriction on a per VPLMN basis.

Figure 4:
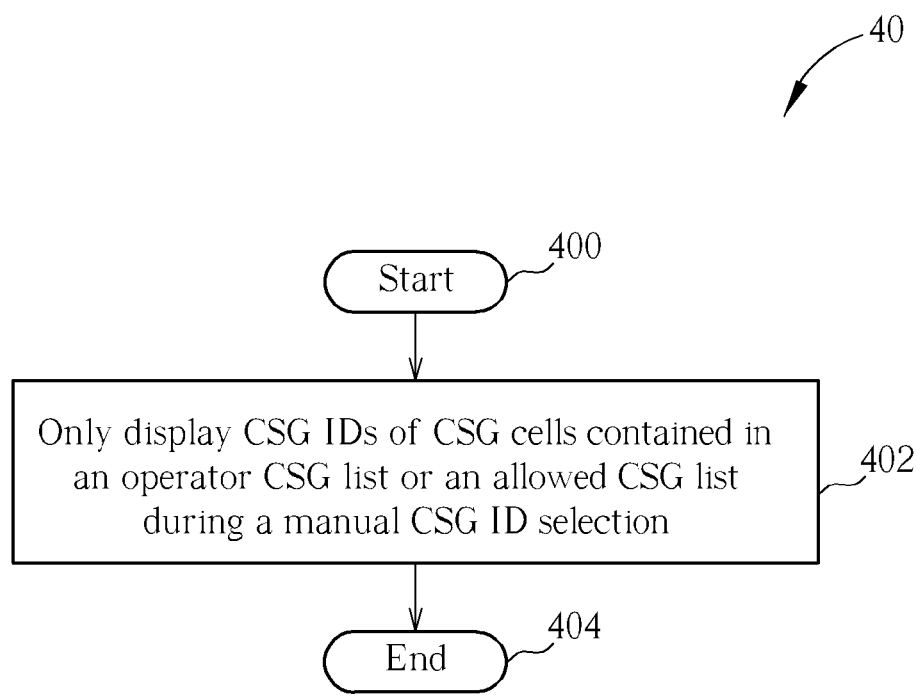
FIG. 4 is a flowchart of an exemplary process.

Please refer to FIG. 4, which is a flowchart of an exemplary process 40. The process 40 is utilized for handling CSG list synchronization for a UE in a wireless communication system and can be compiled into the program code 214. The wireless communication system could be the wireless communication system 10. The UE is inhibited by a HPLMN to access CSG cells not contained in the allowed CSG list or the CSG list in the selected PLMN (e.g. VPLMN). The process 40 includes the following steps:

Step 400: Start.

Step 402: Only display CSG IDs of CSG cells contained in an operator CSG list or an allowed CSG list during a manual CSG ID selection.

Step 404: End.

According to process 40, the UE only displays the CSG IDs of the CSG cells present at that location which is contained in the operator CSG list or allowed CSG list to a user when the user initiates the manual CSG ID selection in the selected PLMN. In other words, the UE doesn't show the CSG IDs not contained in the operator CSG list or the allowed CSG list during manual CSG ID selection procedure. This can prevent a user from selecting the CSG IDs not contained in the operator list or the allowed CSG list and from initiating a registration procedure.

Figure 5:
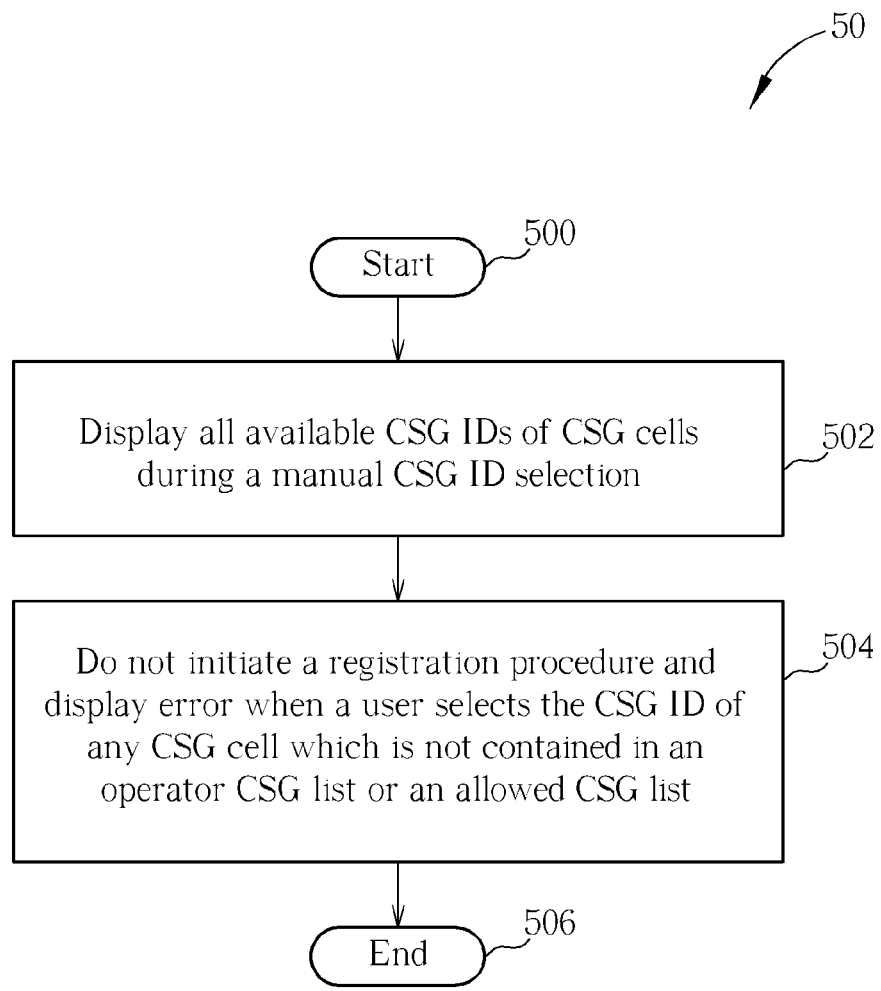
FIG. 5 is a flowchart of an exemplary process.

Please refer to FIG. 5, which is a flowchart of an exemplary process 50. The process 50 is utilized for handling CSG list synchronization for a UE in a wireless communication system and can be compiled into the program code 214. The wireless communication system could be the wireless communication system 10. The UE is inhibited by a HPLMN to access CSG cells not contained in the allowed CSG list or the CSG list in the selected PLMN (e.g. VPLMN). The process 50 includes the following steps:

Step 500: Start.

Step 502: Display all available CSG IDs of CSG cells during a manual CSG ID selection.

Step 504: Do not initiate a registration procedure and display error when a user selects the CSG ID of any CSG cell which is not contained in an operator CSG list or an allowed CSG list.

Step 506: End.

According to process 50, the UE displays all available CSG IDs of CSG cells during the manual CSG ID selection to the user. However, the UE doesn't initiates the registration procedure and display error to the user when the user selects the CSG ID of any CSG cell which is not contained in the operator CSG list or the allowed CSG list. This can prevent the UE from having error message caused by initiating the registration procedure.

Briefly, the UE may exploit the aforementioned exemplary process 40 and 50 to avoid selecting the CSG ID of any CSG cell not contained in the operator CSG list or the allowed CSG list, or does not initiate the registration procedure when selecting the CSG cell not contained in the operator CSG list or the allowed CSG list.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can handling close subscriber group (CSG) list synchronization in the wireless communications system 10.

To sum up, the network may associate a version number with a user subscribed CSG IDs list and send the current version number in a NAS message or an OTA message. When the UE receives the version number currently used in the network in the OTA message the UE associated the received version number with the operator CSG list. When the received version number sent in the NAS message is different than the version number stored in the UE, the UE sends its current version number to the network. Accordingly, the network sends the OTA message to update the version number used in the UE. In addition, the UE may only displays the CSG IDs of the CSG cells contained in the operator CSG list or the allowed CSG list during a manual CSG ID selection, thereby preventing a user from selecting the CSG IDs not contained in the operator list or the allowed CSG list and initiating a registration procedure. Alternatively, the UE displays all available CSG IDs of CSG cells during the manual CSG ID selection. But the UE does not initiate the registration procedure nor display error when the user selects the CSG ID of any CSG cell which is not contained in an operator CSG list or an allowed CSG list.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling close subscriber group (CSG) list synchronization for a network in a wireless communication system, the method comprising:
   associating a first version number with a user subscribed CSG identities (IDs) list such that the first version number represents a version of the user subscribed CSG IDs list, wherein the user subscribed CSG IDs list is stored in the network;
   sending the first version number in a first OTA (over-the-air) message or in a first NAS (non-access stratum) message when the first version number is currently used by the network, wherein the first OTA message is intended to update an operator CSG list which is stored in a mobile device;
   comparing the first version number with a second version number associated with an operator CSG list stored in the mobile device; and
   updating the operator CSG list when the first version number does not match the second version number.

2. The method of claim 1 further comprising increasing the first version number when a change related to the user subscribed CSG IDs list has been made.

3. The method of claim 2, wherein the change related to the user subscribed CSG IDs list is caused by registration, expiration or modification of a CSG subscription.

4. The method of claim 1 further comprising receiving the second version number associated with the operator CSG list from the mobile device, wherein the operator CSG list is stored in the mobile device and the second current version number is currently used by the mobile device and sent to the network in a second NAS message.

5. The method of claim 4 further comprising sending a second OTA message to update the operator CSG list when the first version number does not match the second version number.

6. The method of claim 1 further comprising sending a second NAS message to query for the second version number associated with the operator CSG list from the mobile device, wherein the operator CSG list is stored in the mobile device and the second current version number is currently used by the mobile device.

7. The method of claim 6 further comprising receiving the second version number from the mobile device, wherein the second version number is sent in a third NAS message.

8. A method of handling close subscriber group (CSG) list synchronization for a mobile device in a wireless communication system, the method comprising:
   receiving a first version number in an OTA (over-the-air) message or a first NAS (non-access stratum) message from a network;
   associating the first version number with an operator CSG list stored in the mobile device such that the first version number represents a version of the operator CSG list stored in the mobile device;
   comparing the first version number with a second version number currently used by the mobile device; and
   updating the operator CSG list when the first version number does not match the second version number.

9. The method of claim 8 further comprising sending the second version number in a second NAS message to the network when the first version number does not match the second version number, wherein the second version number is currently used by the mobile device.

10. The method of claim 8 further comprising:
    receiving a second NAS message, wherein the second NAS message is sent by the network to query the second version number which is currently used by the mobile device; and
    sending the second version number in a third NAS message to the network.

11. A method of handling close subscriber group (CSG) list synchronization for a mobile device in a wireless communication system, the method comprising:
    only displaying a plurality of CSG IDs (identities) of a plurality CSG cells contained in an operator CSG list or an allowed CSG list during a manual CSG ID selection;
    wherein the manual CSG ID selection is initiated in a VPLMN (visit public land mobile network) where an HPLMN (Home public land mobile network) inhibits the mobile device to access CSG cells not contained in the operator CSG list or the allowed CSG list.

12. A method of handling close subscriber group (CSG) list synchronization for a mobile device in a wireless communication system, the method comprising:
    displaying a plurality of all available CSG IDs (identities) of a plurality CSG cells during a manual CSG ID selection; and
    the mobile device checking a first CSG ID of a first CSG cell selected by a user against an operator CSG list or an allowed CSG list stored in the mobile device, and not initiating a registration procedure and displaying error when the first CSG ID of the first CSG cell is not contained in the operator CSG list or the allowed CSG list stored in the mobile device;
    wherein the manual CSG ID selection is initiated in a VPLMN (visit public land mobile network) where an HPLMN (Home public land mobile network) inhibits the mobile device to access CSG cells not contained in the operator CSG list or the allowed CSG list.

13. The method of claim 12 further comprising not accessing the first CSG cell.

* * * * *